United States Patent
Suh et al.

(10) Patent No.: US 9,521,474 B2
(45) Date of Patent: Dec. 13, 2016

(54) WAVELENGTH SELECTIVE SWITCH HAVING MULTI-LAYER REFLECTOR

(71) Applicant: InLC Technology, Inc., Gwangju (KR)

(72) Inventors: Seong Woo Suh, Florham Park, NJ (US); Tae Hwan Kim, Daejon (KR)

(73) Assignee: INLC TECHNOLOGY, INC., Gwangju (KR)

( * ) Notice: Subject to any disclaimer, the term of this patent is extended or adjusted under 35 U.S.C. 154(b) by 0 days.

(21) Appl. No.: 14/618,539

(22) Filed: Feb. 10, 2015

(65) Prior Publication Data

US 2016/0234576 A1     Aug. 11, 2016

(51) Int. Cl.

| | | |
|---|---|---|
| *H04Q 11/00* | (2006.01) | |
| *G02B 26/08* | (2006.01) | |
| *G02F 1/01* | (2006.01) | |
| *G02B 27/42* | (2006.01) | |
| *G02B 5/30* | (2006.01) | |
| *G02B 6/35* | (2006.01) | |

(52) U.S. Cl.
CPC ......... *H04Q 11/0005* (2013.01); *G02B 5/3083* (2013.01); *G02B 6/35* (2013.01); *G02B 26/0858* (2013.01); *G02B 27/4244* (2013.01); *G02F 1/0136* (2013.01); *H04Q 2011/003* (2013.01); *H04Q 2011/0026* (2013.01); *H04Q 2011/0035* (2013.01)

(58) Field of Classification Search
CPC ................... H04Q 11/0005; H04Q 2011/0026; H04Q 2011/0035; H04Q 2011/003; G02B 27/4244; G02B 5/3083; G02B 26/0858; G02F 1/0136

See application file for complete search history.

(56) References Cited

U.S. PATENT DOCUMENTS

| | | | |
|---|---|---|---|
| 7,014,326 B2 | 3/2006 | Danagher et al. ............ | 359/615 |
| 7,492,986 B1 | 2/2009 | Kelly .............................. | 385/16 |
| 7,720,329 B2 | 5/2010 | Presley et al. ................. | 385/18 |
| 8,401,348 B2 | 3/2013 | Boduch ........................... | 385/16 |
| 2005/0036202 A1* | 2/2005 | Cohen .................... | G02B 6/272 |
| | | | 359/484.05 |
| 2008/0181559 A1* | 7/2008 | Corem ................... | G02B 6/272 |
| | | | 385/18 |
| 2010/0067900 A1* | 3/2010 | Ishikawa .................. | G02F 1/31 |
| | | | 398/7 |
| 2014/0072257 A1* | 3/2014 | Sakurai .................. | G02B 6/105 |
| | | | 385/11 |

(Continued)

*Primary Examiner* — Leslie Pascal
(74) *Attorney, Agent, or Firm* — Stein IP, LLC (57) ABSTRACT

A wavelength selective switch (WSS) apparatus is disclosed, which includes: a plurality of optical ports configured to output light beams at different angles from one another; a wavelength dispersion element configured to disperse the wavelength components of each light beam; a focusing element configured to focus the dispersed wavelength components of the light beams; and a multi-layer reflecting unit configured to reflect the focused light beams to the focusing element, the multi-layer reflecting unit including a multi-layer reflector and a reflection controller operatively connected to the multi-layer reflector, the multi-layer reflector having a main surface for reflecting the light beams on which a plurality of layers are provided, each layer including a plurality of pixels that are individually controllable by the reflection controller.

20 Claims, 6 Drawing Sheets

(56) References Cited

U.S. PATENT DOCUMENTS

2014/0072302 A1\* 3/2014 Iwama ............... H04Q 11/0005
                                                    398/48
2014/0104560 A1   4/2014 Suh .............................. 349/196
2015/0382087 A1\* 12/2015 Dugan ............... H04Q 11/0005
                                                    398/48

\* cited by examiner

WAVELENGTH SELECTIVE SWITCH HAVING MULTI-LAYER REFLECTOR

BACKGROUND OF THE INVENTION

1. Field of the Invention

The present subject matter relates generally to a wavelength selective switch (WSS) apparatus including a multi-layer reflector, and more specifically, to a WSS apparatus including a multi-layer reflector having a plurality of layers formed with a plurality of pixels that are controllable by a reflection controller.

2. Description of the Related Art

In optical communications systems, the use of wavelength selective witching for applications of optical cross-connects has attracted much interest because of the goal of fully flexible, networks where the paths of each wavelength can be reconfigured to allow arbitrary connection between nodes with the capacity appropriate for that link at a particular point in time.

Conventional optical switches are typically based on optical-electrical-optical (OEO) conversion technologies. In an OEO scheme, the optical signal is transduced into an electrical signal, the signal is switched electrically, and is reconverted back into a new optical beam. Unfortunately, the OEO conversion is limited by the processing speed of the available electronics. Furthermore, OEO devices are dependent on wavelength, modulation format, and modulation frequency.

More recently, there has been increased interest in all-optical switching, in which one or more wavelengths are selectively switched without the need to convert the optical signals to an electronic signal. Micro-electro-mechanical systems (MEMS) have played an important part in all-optical switching since these miniature actuators can be designed to simultaneously switch spatially resolved portions of the optical signal independently from each other. Furthermore, MEMS devices can be designed to be compact, have a low power consumption, and can be mass produced to produce a low cost switch. Liquid crystal (LC) modulators have played an important role in all-optical switching for similar reasons.

In many prior art switches using MEMS or LC modulators, the switch includes a dispersive element to spatially separate the multiplexed beam of light into individual communication channels, which are independently modified by the modulator. The dispersive element is typically a reflective or transmissive diffraction grating used in either a single pass or double pass configuration. For example, in the single pass configuration a first diffraction grating performs the demultiplexing while a second diffraction grating performs the multiplexing. In the double pass configuration, a single diffraction grating is combined with a reflector to provide demultiplexing in a first pass therethrough and multiplexing in the second pass therethrough.

U.S. Pat. No. 7,014,326 to Danagher et al. for "Wavelength Blocker" describes the basic principles of a wavelength blocker, which is capable of blocking a variable number of non-consecutive channels. U.S. Pat. No. 7,720,329 to Presley et al. for "Segmented Prism Element and Associated Methods for Manifold Fiberoptic Switches" describes a fiber optic switch utilizing a segmented prism element, including a fiber optic switch used in multi-channel optical communications networks and having one or more arrays of micro electromechanical system (MEMS) mirrors. U.S. Pat. No. 8,401,348 to Boduch for "Methods and Apparatus for Constructing Large Wavelength Selective Switches Using Parallelism" describes constitution of a large wavelength selective switch (WSS) system by coupling small port WSSs. U.S. Pat. No. 7,492,986 to Kelly for "Apparatus and Method for Optical Switching with Liquid Crystals and Birefringent Wedges" describes the switching of optical signals using liquid crystals (LCs) and a birefringent wedge.

U.S. patent application Ser. No. 14/055,171, filed by the applicant on Oct. 16, 2013, published by U.S.P.T.O. on Apr. 17, 2014, is directed to a WSS including an LCOS for selectively diverting a certain wavelength component of light beams to continue to propagate and keeping another wavelength component of the light beams from propagating by controlling a voltage applied thereto and/or a polarization of the light beams. In accordance with such WSS structure, accurate control of the output angle of the beams can be realized. In addition, since it utilizes a polarization mode in the attenuation domain, any crosstalk between the domains, which happened when adopting conventional phase mode attenuation, can be prevented.

SUMMARY OF THE INVENTION

An aspect of the present subject matter is directed to a wavelength selective switch (WSS) apparatus comprising: a plurality of optical ports configured to output light beams at different angles from one another, a wavelength dispersion element configured to disperse the wavelength components of each light beam, a focusing element configured to focus the dispersed wavelength components of the light beams, and a multi-layer reflecting unit configured to reflect the focused light beams to the focusing element, the multi-layer reflecting unit including a multi-layer reflector and a reflection controller operatively connected to the multi-layer reflector, the multi-layer reflector having a main surface for reflecting the light beams on which a plurality of layers are provided, each layer including a plurality of pixels that are individually controllable by the reflection controller.

The WSS apparatus according to an aspect of the present subject matter, further comprises: a polarization diversity element configured to modulate the light beams input thereto and output the light beams with substantially the same polarization, and an anamorphic expansion element configured to anamorphic expand the light beams.

In the WSS apparatus according to an aspect of the present subject matter, the polarization diversity element and the anamorphic expansion element are arranged in a path of the light beams between the plurality of the optical ports and the wavelength dispersion element.

In the WSS apparatus according to an aspect of the present subject matter, the plurality of pixels in each layer on the main surface of the multi-layer reflector are configured to attenuate or block the light beams reflected therefrom by controlling each pixel by the reflection controller.

In the WSS apparatus according to an aspect of the present subject matter, the plurality of optical ports, the wavelength dispersion element, the focusing element, and the multi-layer reflecting unit are configured in such a way that the light beams reflected from the multi-layer reflector travel to the plurality of optical ports.

In the WSS apparatus according to an aspect of the present subject matter, the plurality of optical ports comprise a first optical port and a second optical port, the first optical port outputting a first light beam and the second optical port a second light beam, the multi-layer reflector of the multi-layer reflecting unit comprising a first layer and a second layer, each of the first and second layers including the plurality of pixels that are individually controllable by the reflection controller.

In the WSS apparatus according to an aspect of the present subject matter, the first and second optical ports and the wavelength dispersion element are configured to allow the first and second light beams to cross before reaching the focusing element, whereby the first light beam hits on the second layer of the multi-layer reflector while the second light beam hits on the first layer of the multi-layer reflector.

In the WSS apparatus according to an aspect of the present subject matter, the first and second optical ports, the wavelength dispersion element, and the focusing element are configured to allow the first and second light beams to cross after passing through the focusing element, whereby the first light beam hits on the second layer of the multi-layer reflector while the second light beam hits on the first layer of the multi-layer reflector.

In the WSS apparatus according to an aspect of the present subject matter, the first and second optical ports, the wavelength dispersion element, and the focusing element are configured to keep the first and second light beams from crossing at any point in a light travelling path between the plurality of optical ports and the multi-layer reflecting unit, whereby the first light beam hits on the first layer of the multi-layer reflector while the second light beam hits on the second layer of the multi-layer reflector.

In the WSS apparatus according to an aspect of the present subject matter, each of the plurality of layers on the main surface of the multi-layer reflector comprises a liquid crystal (LC) phase array, the amount of the light beams being controlled by a voltage or current applied to the LC phase array by the reflection controller, and the multi-layer reflector comprises a plurality of mirror surfaces arranged opposite side of the main surface, each mirror surface being configured such that the light beams reflected therefrom travel in a direction to predetermined one of the plurality of optical ports.

In the WSS apparatus according to an aspect of the present subject matter, the multi-layer reflector further comprises a birefringent material in front of the LC phase array to refract the light beams passing therethrough according to the polarization of the light beams, thereby changing a light path and the amount of the light beams to the predetermined optical port.

In the WSS apparatus according to an aspect of the present subject matter, each of the plurality of layers on the main surface of the multi-layer reflector comprises one selected from the group consisting of a liquid crystal on silicon (LCOS) and a micro-electromechanical system (MEMS) for stirring the light beams to one of the plurality of optical ports or to other directions to thereby control the amount of the light beams entering the plurality of optical ports.

In the WSS apparatus according to an aspect of the present subject matter, the plurality of optical ports comprise at least one input port and at least one output port.

In the WSS apparatus according to an aspect of the present subject matter, the plurality of optical ports comprise at least one input/output port.

In the WSS apparatus according to an aspect of the present subject matter, the plurality of optical ports comprise N input ports and an output port, where N is a natural number equal to or greater than two, the N input ports being coupled by a coupler to the output port, and the multi-layer reflecting unit is configured to reflect predetermined wavelength components of the light beams in a direction to one of the N input ports and blocks the predetermined wavelength components of the light beams from entering any of the rest N−1 input ports by controlling the plurality of pixels on the multi-layer reflector by the reflection controller.

In the WSS apparatus according to an aspect of the present subject matter, the plurality of optical ports comprise an input port and M output ports, where M is a natural number equal to or greater than two, the input port being split by a splitter to the M output ports, and the multi-layer reflecting unit is configured to reflect predetermined wavelength components of the light beams in a direction to one of the M output ports and blocks the predetermined wavelength components of the light beams from entering any of the rest M−1 output ports by controlling the plurality of pixels on the multi-layer reflector by the reflection controller.

Another aspect of the present subject matter is directed to a method of controlling a WSS apparatus, comprising: outputting light beams, by a plurality of optical ports, at different angles from one another; dispersing the wavelength components of each light beam using a wavelength dispersion element; focusing the dispersed wavelength components of the light beams using a focusing element configured to; and reflecting the focused light beams to the focusing element using a multi-layer reflecting unit, the multi-layer reflecting unit including a multi-layer reflector and a reflection controller operatively connected to the multi-layer reflector, the multi-layer reflector having a main surface for reflecting the light beams on which a plurality of layers are provided, each layer including a plurality of pixels that are individually controllable by the reflection controller.

The method according to an aspect of the present subject matter, further comprising: modulating the light beams input thereto and outputting the light beams with substantially the same polarization using a polarization diversity element; and anamorphic expanding the light beams using an anamorphic expansion element.

In the method according to an aspect of the present subject matter, the plurality of optical ports comprise N input ports and an output port, where N is a natural number equal to or greater than two, the N input ports being coupled by a coupler to the output port, and the multi-layer reflecting unit is configured to reflect predetermined wavelength components of the light beams in a direction to one of the N input ports and blocks the predetermined wavelength components of the light beams from entering any of the rest N−1 input ports by controlling the plurality of pixels on the multi-layer reflector by the reflection controller.

In the method according to an aspect of the present subject matter, the plurality of optical ports comprise an input port and M output ports, where M is a natural number equal to or greater than two, the input port being split by a splitter to the M output ports, and the multi-layer reflecting unit is configured to reflect predetermined wavelength components of the light beams in a direction to one of the M output ports and blocks the predetermined wavelength components of the light beams from entering any of the rest M−1 output ports by controlling the plurality of pixels on the multi-layer reflector by the reflection controller.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1A:
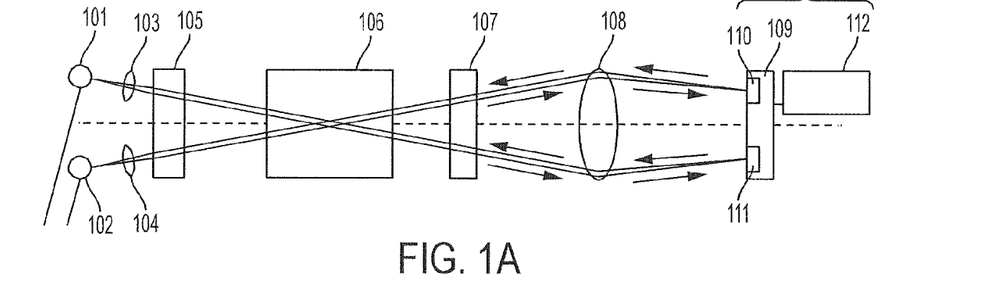
FIG. 1A is a schematic side view of a wavelength selective switch (WSS) structure including a multi-layer reflector according to an embodiment of the present subject matter.
Figure 1B:
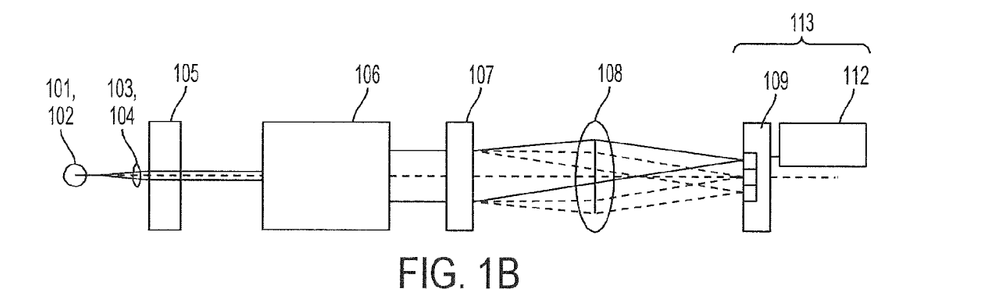
FIG. 1B is a schematic top plan view of the WSS structure including the multi-layer reflector according to the embodiment of the present subject matter.

FIG. 1A is a schematic side view of a wavelength selective switch (WSS) structure including a multi-layer reflector according to an embodiment of the present subject matter. FIG. 1B is a schematic top plan view of the WSS structure including the multi-layer reflector according to the embodiment of the present subject matter.

In FIGS. 1A and 1B, a first light beam is output from an input/output (I/O) port 101 is collimated by a collimating lens 103 and then pass through a polarization diversity element 105. The light beam output from the polarization diversity element 105 has substantially the same polarization. This light beam of the same polarization enters an anamorphic expansion element 106 such as a prism pair or a cylindrical lens pair and experiences expansion along an optical axis. The expanded beam enters a wavelength dispersion element 107 such as a diffraction grating which disperses the wavelength components of each input beam. The dispersed light beam enters a focusing element 108 where the beam refracts towards a multi-layer reflecting unit 113. The multi-layer reflecting unit 113 includes a multi-layer reflector 109 and a reflection controller 112 operatively connected to the multi-layer reflector 109 to control a plurality of pixels formed in each of a plurality of layers 110, 111 provided on a main surface of the multi-layer reflector 109. The dispersed light beam outputs from the focusing element 108 hits on a second layer 111 of the multi-layer reflector 109. Here, the second layer 111 of the multi-layer reflector 109 includes the plurality of pixels which, by the control of the reflection controller 112, can attenuate or block the wavelength components of the light beam reflected therefrom on a pixel basis.

Meanwhile, as shown in FIGS. 1A and 1B, a second light beam output from an I/O port 102 similarly passes through a collimating lens 104, the polarization diversity element 105, the anamorphic expansion element 106, the wavelength dispersion element 107, and the focusing element 108 before reaching a first layer 110 of the multi-layer reflector 109. Likewise, the first layer 110 of the multi-layer reflector 109 includes the plurality of pixels which, by the control of the reflection controller 112, can attenuate or block the wavelength components of the light beam reflected therefrom on a pixel basis.

The first and second light beams are reflected from the second and first layers 111, 110, respectively, of the multi-layer reflector 109. The wavelength components of the reflected beams at the multi-layer reflector 109 may be undergone attenuation or blockage control, on a pixel basis, by the reflection controller 112. In case a certain wavelength component of the light beams are attenuated or blocked, it does not reach a corresponding I/O port. On the other hands, when a certain wavelength component of the first and second light beams does not experience attenuation or blockage at the multi-layer reflector 109, they travel back to the corresponding I/O ports 101, 102, respectively, via the focusing element 108, the wavelength dispersion element 107, the anamorphic expansion element 106, the polarization diversity element 105, and collimating lenses 103, 104, respectively, in this order.

Figure 2A:
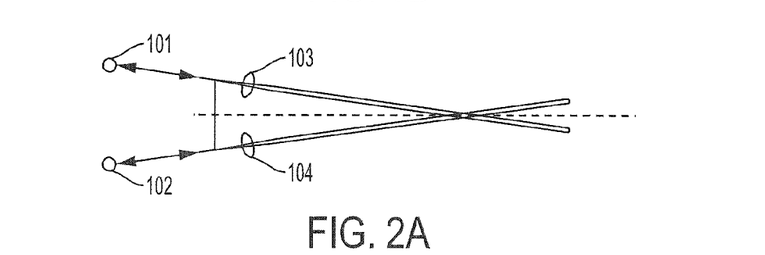
FIG. 2A is a schematic side view of a plurality of input ports with two collimators aiming at different angles according to an embodiment of the present subject matter.
Figure 2B:
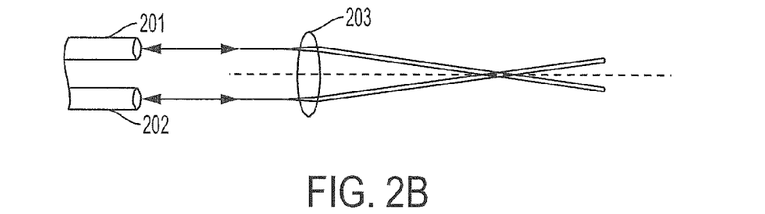
FIG. 2B is a schematic side view of a plurality of input ports with two optical fibers arranged off-center and a lens according to an embodiment of the present subject matter.
Figure 2C:
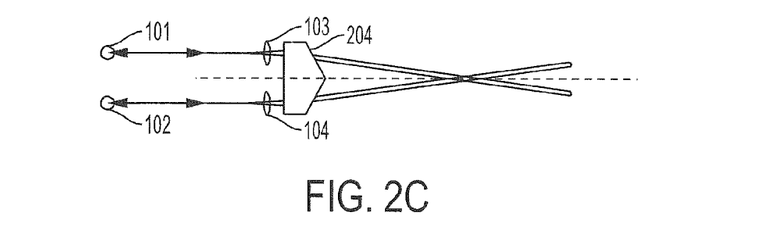
FIG. 2C is a schematic side view of a plurality of input ports with two collimators arranged in parallel and a roof prism according to an embodiment of the present subject matter.

FIG. 2A is a schematic side view of a plurality of input ports according to an embodiment of the present subject matter wherein two collimators aim at different angles. FIG. 2B is a schematic side view of a plurality of input ports according to another embodiment of the present subject matter wherein two optical fibers are arranged off-center and a lens behind the two optical fibers renders two beams passing through the lens travel in different angles. FIG. 2C is a schematic side view of a plurality of input ports according to still another embodiment of the present subject matter wherein two collimators are arranged in parallel and behind them is a roof prism thereby rendering the two beams passing through the prism travel in different angles.

In FIG. 2A, the first light beam output from the I/O port 101 propagates to the collimator 103 obliquely to the second light beam's path towards the collimator 104 so that the first and second beams cross after the collimation by the collimators 103, 104, respectively. In FIG. 2B, first and second optical fibers 201, 202 outputting the first and second light beams, respectively, are arranged off-center with respect to the central axis of a lens 203 to which the beams are entering. The two beams then undergo refraction by the lens 203 and propagate obliquely so that they cross at a certain point. In FIG. 2C, two collimators 103, 104 are arranged in parallel and behind them is a roof prism 204 in such a way that the two beams from the I/O ports 101, 102 travel through the collimators 103, 104 and the prism 204, experience refraction, and propagate obliquely each other to thereby cross at a certain point as shown.

Figure 3A:
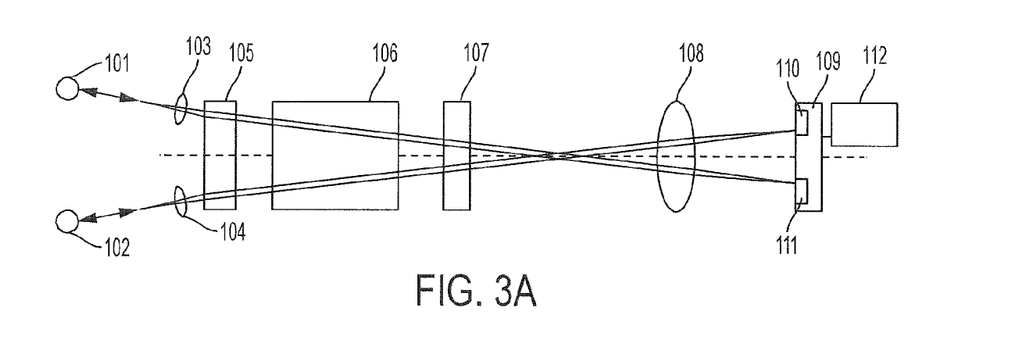
FIG. 3A is a schematic side view of a WSS structure according to an embodiment of the present subject matter with a first crossing point of two light beams.
Figure 3B:
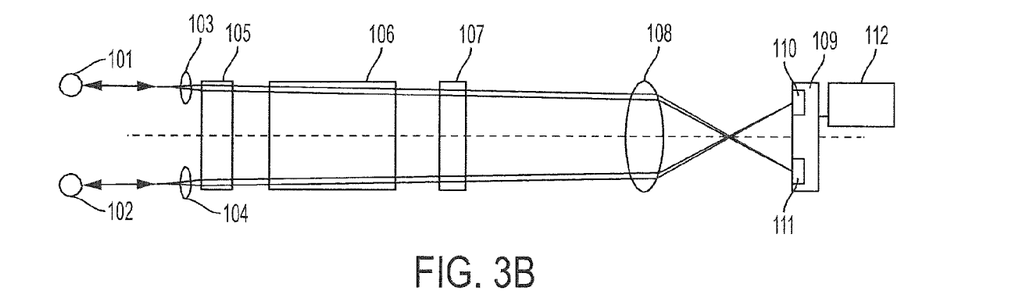
FIG. 3B is a schematic side view of a WSS structure according to an embodiment of the present subject matter with a second crossing point of two light beams.
Figure 3C:
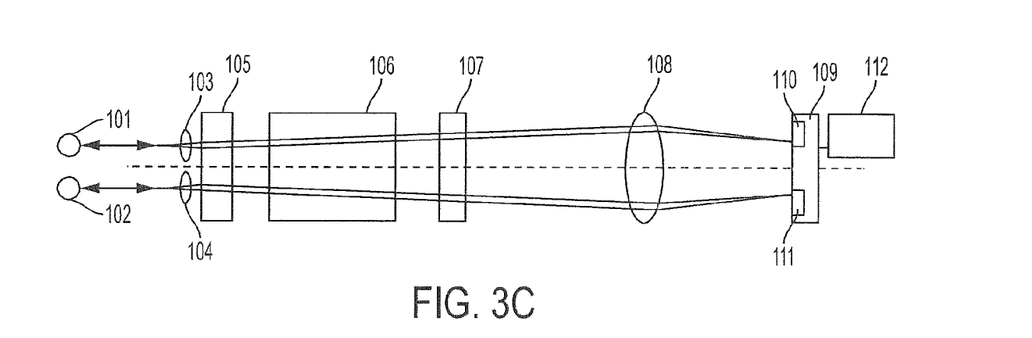
FIG. 3C is a schematic side view of a WSS structure according to an embodiment of the present subject matter with a third crossing point of two light beams.
Figure 3D:
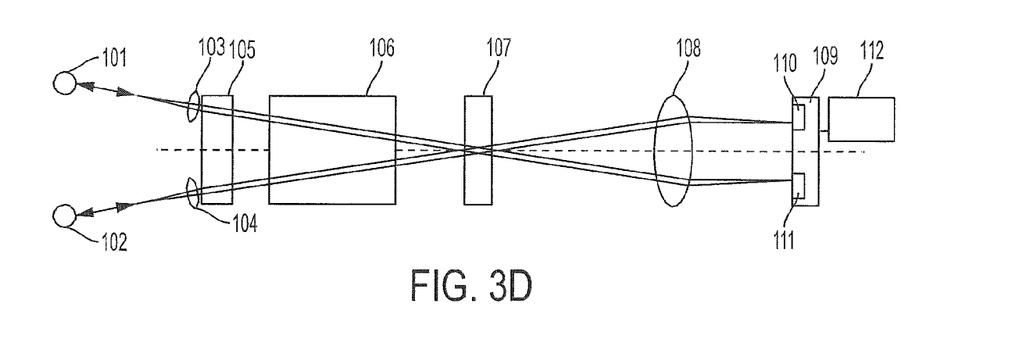
FIG. 3D is a schematic side view of a WSS structure according to an embodiment of the present subject matter with a fourth crossing point of two light beams.

FIG. 3A is a schematic side view of a WSS structure according to an embodiment of the present subject matter wherein two light beams output from two optical ports cross at a point behind the front focal length of a focusing lens but before the focusing lens. FIG. 3B is a schematic side view of a WSS structure according to an embodiment of the present subject matter wherein two light beams output from two optical ports cross at a point behind a focusing lens but before a multi-layer reflector. FIG. 3C is a schematic side view of a WSS structure according to an embodiment of the present subject matter wherein two light beams output from two optical ports do not cross between the front and back focal lengths of a focusing lens. FIG. 3D is a schematic side view of a WSS structure according to an embodiment of the present subject matter wherein two light beams output from two optical ports cross at the point of the front focal length of a focusing lens.

FIGS. 3A-3D illustrate how a crossing point of the two beams can be designed by adjusting the parameters of the elements in the WSS apparatus. In FIG. 3A, the first and second beams from the I/O ports 101, 102 are crossing at a point that is within the front focal length of the lens 108. In FIG. 3B, the first and second beams are crossing at a point between the lens 108 and the multi-layer reflector 109. In FIG. 3C, the crossing point of the two beams is formed beyond the front focal length of the lens 108 (not shown). In FIG. 3D, the crossing point of the two beams coincides with the front focal length of the lens 108. A different crossing point of the two light beams from the first and second I/O ports 101, 102, respectively, may dictate the change in the incident angles of the two beams to the two layers 110, 111, respectively, on the multi-layer reflector 109.

Figure 4A:
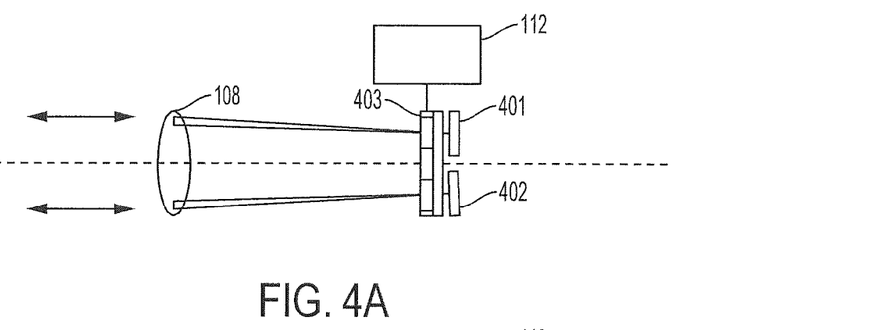
FIG. 4A is a schematic side view of a focusing element with a multi-layer reflecting unit according to an embodiment of the present subject matter.
Figure 4B:
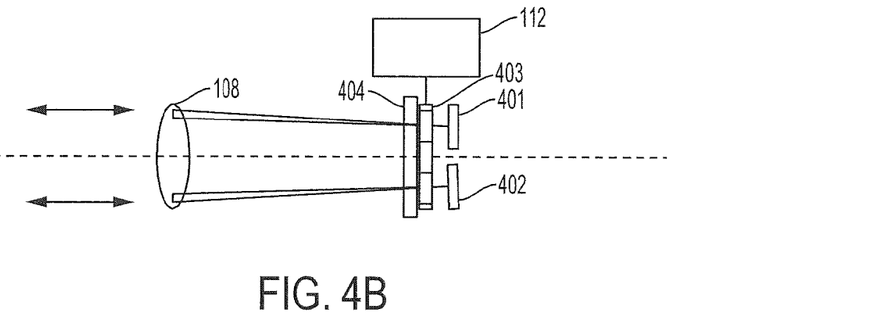
FIG. 4B is a schematic side view of a focusing element with a multi-layer reflecting unit according to another embodiment of the present subject matter.
Figure 4C:
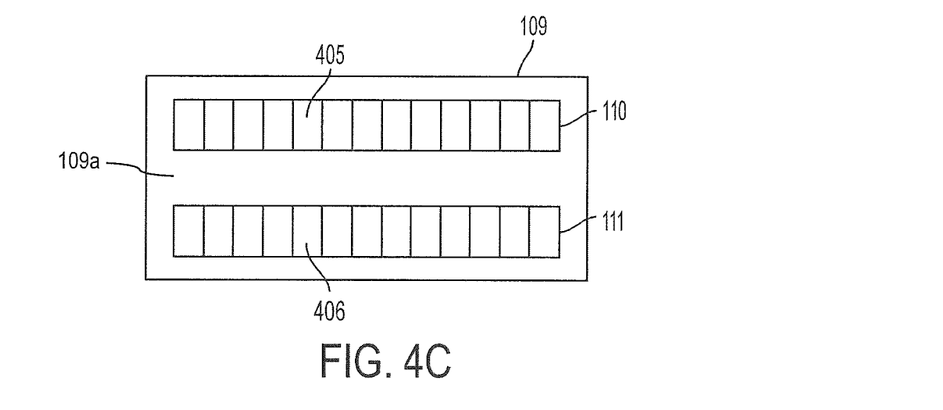
FIG. 4C is a schematic front view of a multi-layer reflector with LC layers used in the embodiments of FIGS. 4A and 4B.
Figure 4D:
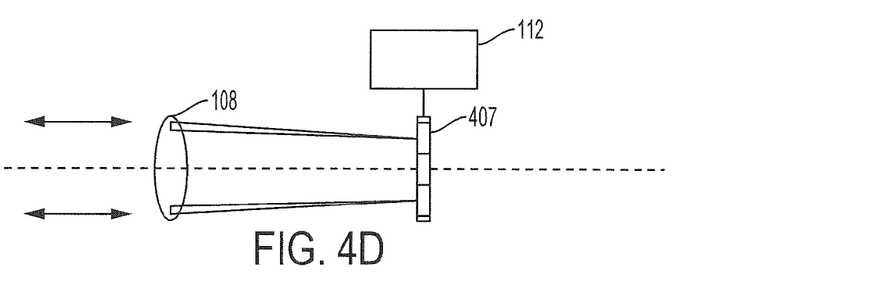
FIG. 4D is a schematic side view of a focusing element with a multi-layer reflecting unit using a liquid crystal on silicon (LCOS) or a micro-electromechanical system (MEMS), according to an embodiment of the present subject matter.
Figure 4E:
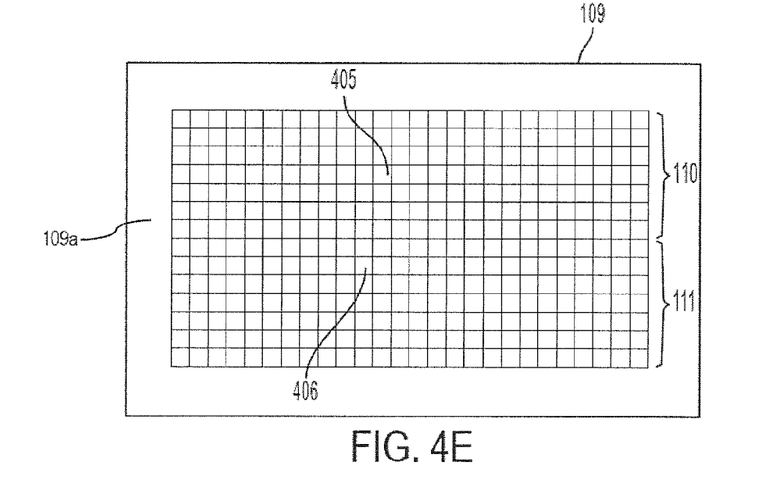
FIG. 4E is a schematic front view of a multi-layer reflector with an LCOS used in the embodiment of FIG. 4D.

FIG. 4A is a schematic side view of a focusing element with a multi-layer reflecting unit according to an embodiment of the present subject matter wherein two flat mirrors are arranged behind a liquid crystal (LC) plate in such a way that two light beams are reflected towards respective output ports. FIG. 4B is a schematic side view of a focusing element with a multi-layer reflecting unit similar to the embodiment of FIG. 4A except that a birefringent material is placed before the LC plate to shift the paths of the two beams. FIG. 4C is a schematic front view of a multi-layer reflector used in the embodiments of FIGS. 4A and 4B wherein the multi-layer reflector has a main surface on which two layers of multiple LC pixels are provided. FIG. 4D is a schematic side view of a focusing element with a multi-layer reflecting unit using a liquid crystal on silicon (LCOS) or a micro-electromechanical system (MEMS), according to an embodiment of the present subject matter. FIG. 4E is a schematic front view of a multi-layer reflector used in the embodiment of FIG. 4D wherein the multi-layer reflector has a main surface on which two layers of the multiple pixels of an LCOS phase array are provided.

FIGS. 4A-4E illustrate various ways to constitute the multi-layer reflector 109. In FIG. 4A, the multi-layer reflector 109 is constituted utilizing a polarization mode of the LC wherein two flat mirrors 401, 402 are arranged obliquely behind a LC phase array 403 to reflect the two beams back to the I/O ports 101, 102. Here, the LC phase array 403, by the control of the reflection controller 112, can change the polarization of the LC, thereby controlling the amount of the light beams passing through a polarizer as associated (not shown). The polarizer can be located any point between an input port and an output port (in this embodiment, the input and output ports are combined as the I/O ports 101, 102). The polarizer can be omitted from the structure in case diversity optics carry out the functions of a polarizer. Alternatively, the two flat mirrors 401, 402 can be replaced with a single multi-facet mirror (not shown) without negatively affecting overall performance of the apparatus. The angle between the two mirrors 401, 402 varies depending on a desired crossing point of the two beams, as discussed above with regard to FIGS. 3A-3D.

The multi-layer reflector 109 as illustrated in FIG. 4B is similar to that of FIG. 4A except for a birefringent material 404 arranged before the LC phase array 403 to change the light paths of the light beams passing therethrough, to thereby control the amount of light beams travelling to the I/O ports 101, 102. FIG. 4C shows a multi-layer reflector 109 used in the embodiments of FIGS. 4A and 4B wherein the multi-layer reflector 109 has a main surface 109a on which two layers 110, 111 of multiple LC pixels 405, 406 are provided. Each pixel in the two layers 110, 111 is independently controllable by the reflection controller 112.

FIG. 4D illustrates a focusing element with a multi-layer reflector 109 using an LCOS or a MEMS 407, which can steer the light beams to the I/O ports 101, 102 or other directions. FIG. 4E illustrates a multi-layer reflector 109 used in the embodiment of FIG. 4D wherein the multi-layer reflector 109 has a main surface 109a on which two layers 110, 111 of the multiple pixels 405, 406 of an LCOS phase array 407 are provided. Each pixel in the two layers 110, 111 is independently controllable by the reflection controller 112, by applying different phase array functions depending on a target port 101, 102. Alternatively, a multi-layer reflector 109 having an LCOS 407 can be operated by a polarization mode as in FIGS. 4A and 4B.

Figure 5A:
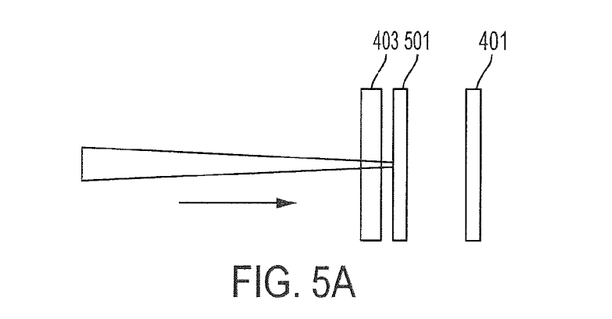
FIG. 5A is a schematic side view of a multi-layer reflecting unit showing the operating principle as applied for the blockage or attenuation of the light beams when the polarization modes of an LC or LCOS are used.
Figure 5B:
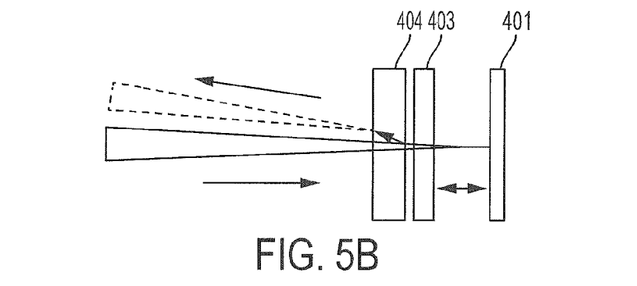
FIG. 5B is a schematic side view of a multi-layer reflecting unit showing the operating principle as applied for the blockage or attenuation of the light beams when the polarization modes of an LC or LCOS are used and a birefringent material is placed before the LC or LCOS.
Figure 5C:
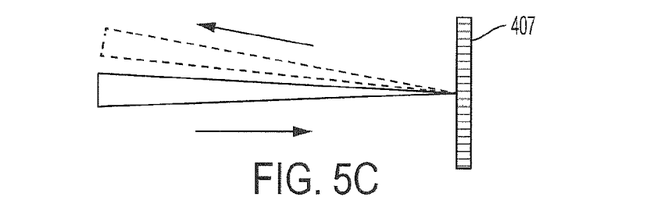
FIG. 5C is a schematic side view of a multi-layer reflecting unit showing the attenuation of light beams by controlling an LCOS or MEMS.

FIG. 5A is a schematic side view of a multi-layer reflecting unit showing the operating principle as applied for the blockage or attenuation of the light beams when the polarization modes of an LC or LCOS are used. FIG. 5B is a schematic side view of a multi-layer reflecting unit showing the operating principle as applied for the blockage or attenuation of the light beams when the polarization modes of an LC or LCOS are used and a birefringent material is placed before the LC or LCOS. FIG. 5C is a schematic side view of a multi-layer reflecting unit showing the attenuation of light beams by controlling an LCOS or MEMS.

FIG. 5A shows that when the polarization state of the LC or LCOS 403 changes, the amount of the light beam passing through a polarizer 501 is reduced. FIG. 5B shows that when the polarization state of the LC or LCOS 403 changes, the birefrigent material 404 changes the paths of the light beams to thereby reduce the amount of the light beams traveling to the output ports 101, 102. FIG. 5C shows that the LCOS or MEMS 403 changes the paths of the light beams, thereby reducing the amount of the light beams directing to the output ports 101, 102.

Figure 6:
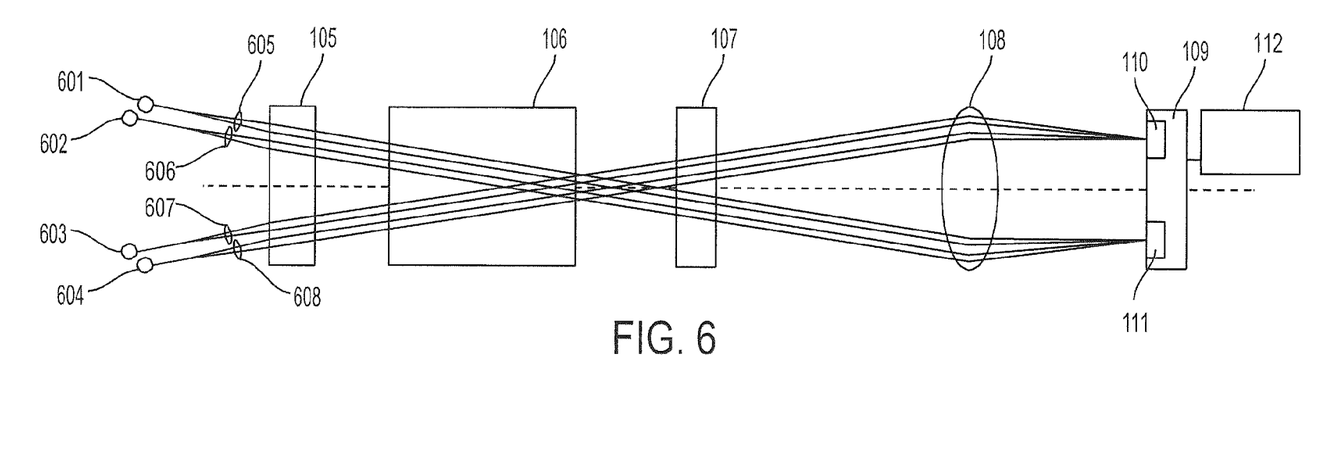
FIG. 6 is a schematic side view of a WSS structure adopting an alternative arrangement for input and output ports according to an embodiment of the present subject matter wherein the input ports are separated from the output ports.

FIG. 6 is a schematic side view of a WSS structure adopting an alternative arrangement for input and output ports according to an embodiment of the present subject matter wherein the input ports are separated from the output ports.

FIG. 6 illustrates a different way of arranging input ports 601, 603 and output ports 602, 604 wherein the input ports 601, 603 are used for outputting the light beams into the structure while the output ports 602, 604 are used for receiving the light beams from the structure. First and second light beams output from the input ports 601, 603 respectively enter into input collimating lenses 605, 607, and are reflected from the second and first layers 111, 110 on the multi-layer reflector 109 before travelling back to the output ports 602, 604, respectively, via output collimating lenses 606, 608, respectively. In this embodiment, use of a circulator (not shown) can be removed.

Figure 7:
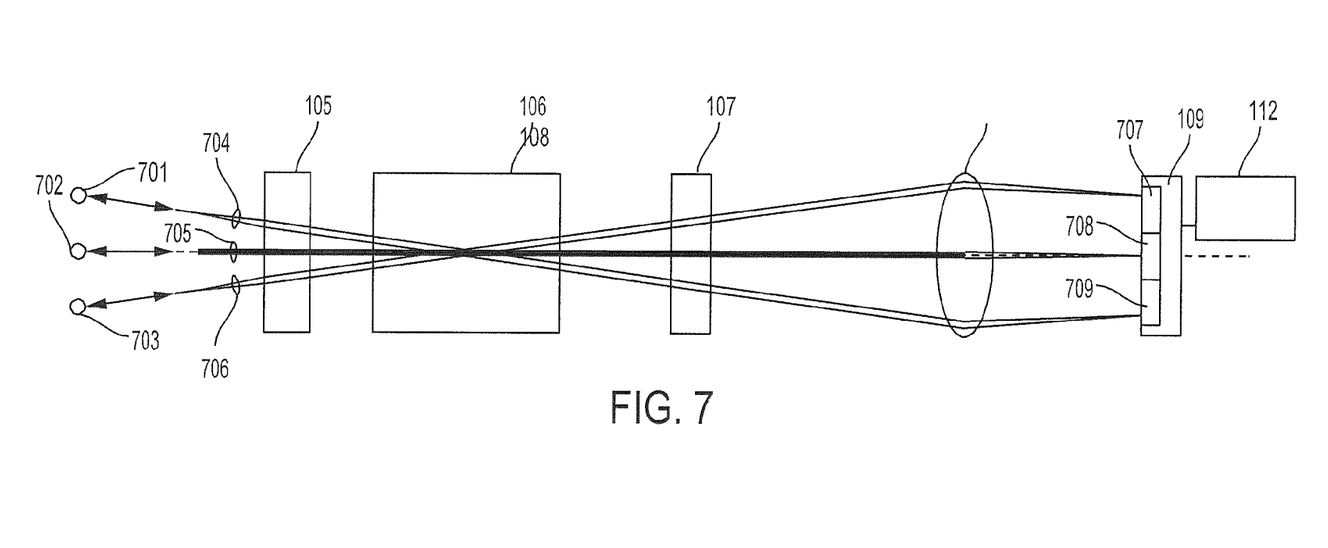
FIG. 7 is a schematic side view of a WSS structure adopting three or more input/output ports according to an embodiment of the present subject matter.

FIG. 7 is a schematic side view of a WSS structure adopting three or more input/output ports according to an embodiment of the present subject matter.

In FIG. 7, first, second and third light beams output from three I/O ports 701, 702, 703 pass through three collimating lenses 704, 705, 706, respectively, and hit on three layers 709, 708, 707 of the multi-layer reflector 109, respectively. The operating principle of this three-I/O port structure is similar to that of the two-I/O port structure as discussed above. Likewise, it is possible to constitute a WSS apparatus having more than three independent I/O ports.

Figure 8A:
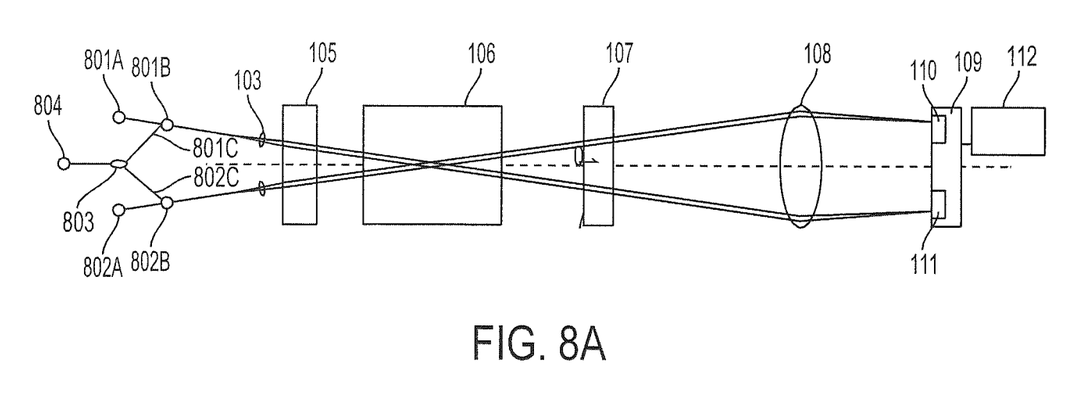
FIG. 8A is a schematic side view of a WSS structure having N input ports coupled by a coupler with an output port according to an embodiment of the present subject matter.
Figure 8B:
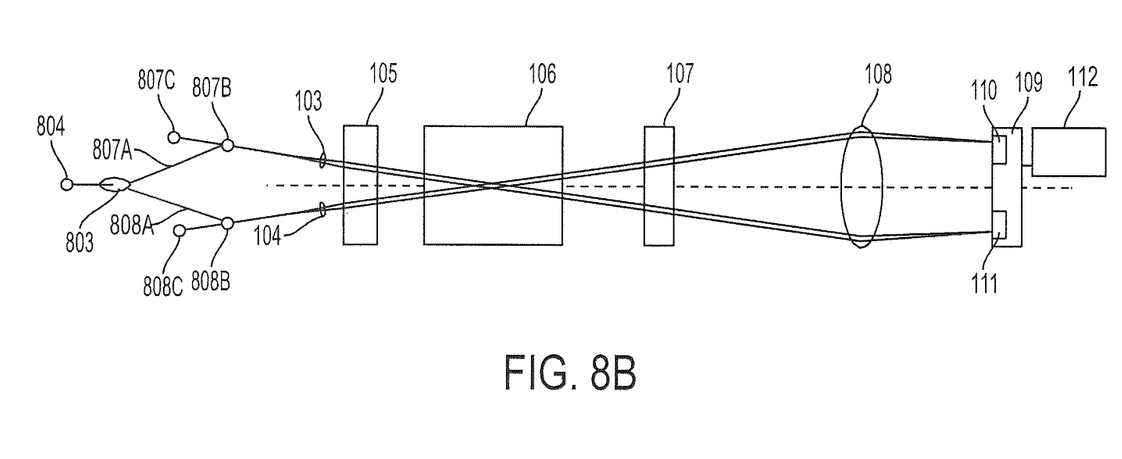
FIG. 8B is a schematic side view of a WSS structure having an input port coupled by a coupler with M output ports according to an embodiment of the present subject matter.

FIG. 8A is a schematic side view of a WSS structure having N input ports coupled by a coupler with an output port according to an embodiment of the present subject matter; and FIG. 8B is a schematic side view of a WSS structure having an input port coupled by a coupler with M output ports according to an embodiment of the present subject matter.

FIGS. 8A and 8B illustrate a 2×1 WSS and a 1×2 WSS, respectively. In the 2×1 WSS structure shown in FIG. 8A, a single common output port 804 is coupled by a coupler 803 to first and second output ports 801C, 802C which is connected to first and second input ports 801A, 801A through circulator 801B and 802B so that of all the wavelength components, say $\lambda_1$~$\lambda_{80}$, of the first light beam from the first input port 801, first desired wavelength components, say $\lambda_1$~$\lambda_{40}$, are selected (or not blocked) to enter the output port 804, whereas of all the wavelength components, say $\lambda_1$~$\lambda_{80}$, of the second light beam from the second input port, second desired wavelength components, say $\lambda_{41}$~$\lambda_{80}$, are selected (or not blocked) to enter the same output port 804. By this constitution of the 2×1 WSS, it is possible to obtain desired wavelength components separately for each input port, say either $\lambda_1$~$\lambda_{40}$ or $\lambda_{41}$~$\lambda_{80}$, at the single common output port 804 without involving an electro-mechanical switching motion. In case an input port and out ports are separated as shown in FIG. 6 without using a circulator, each circulator can me omitted and both outputs ports 801C, 802C can be connected to the coupler 803 directly. In contrast, the 1×2 WSS structure shown in FIG. 8B has a single common input port 805 that is split by a splitter 806 and connected to first and second input ports 807A, 808A through circulator 807B and 808B respectively, and is configured to select (or not block) first desired wavelength components, say $\lambda_1$~$\lambda_{40}$, for the first output port 807C while selecting (or not blocking) second desired wavelength components, say $\lambda_{41}$~$\lambda_{80}$, for the second output port 808C. By this constitution of the 1×2 WSS, it is possible to obtain desired wavelength components separately, say either $\lambda_1$~$\lambda_{40}$ or $\lambda_{41}$~$\lambda_{80}$, at respective output port 807C or 808C without involving an electro-mechanical switching motion. In case an input port and out ports are separated as shown in FIG. 6 without using circulator, each circulator can me omitted and both input ports 807A, 808A can be connected to the single common input 805 to the splitter 806 directly.

As such, the WSS apparatus as explained and illustrated herein can select specific wavelength components of light beams by controlling multiple pixel layers formed on a reflector. Thus, the WSS apparatus according to the present subject matter does not require any electro-mechanical switching to select desired wavelength components of beams at an output side, thereby significantly reducing leakage losses of light beams that would otherwise happen in switching motions. In addition, the WSS apparatus according to the present subject matter is simpler and more stable than conventional ones.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A wavelength selective switch (WSS) apparatus comprising:
    a plurality of optical fiber ports configured to output light beams at different angles from one another;
    a wavelength dispersion element configured to disperse the wavelength components of each light beam;
    a focusing element configured to focus the dispersed wavelength components of the light beams; and
    a multi-layer reflecting unit configured to reflect the focused light beams to the focusing element, the multi-layer reflecting unit including a multi-layer reflector and a reflection controller operatively connected to the multi-layer reflector, the multi-layer reflector having a main surface for reflecting the light beams on which a plurality of layers are provided, each layer including a plurality of pixels that are individually controllable by the reflection controller,
    wherein the WSS apparatus is arranged that a predetermined wavelength component of a light beam output from one of the optical fiber ports is reflected by the multi-layer reflector to travel back to the one of the optical fiber ports.

2. The WSS apparatus according to claim 1, further comprising:

a polarization diversity element configured to change polarizations of the light beams input thereto and output the light beams with substantially one polarization; and an anamorphic expansion element configured to anamorphic expand the light beams.

3. The WSS apparatus according to claim 2, wherein the polarization diversity element and the anamorphic expansion element are arranged in a path of the light beams between the plurality of the optical fiber ports and the wavelength dispersion element.

4. The WSS apparatus according to claim 1, wherein the plurality of pixels in each layer on the main surface of the multi-layer reflector are configured to attenuate or block the light beams reflected therefrom by controlling each pixel by the reflection controller.

5. The WSS apparatus according to claim 1, wherein the plurality of optical fiber ports, the wavelength dispersion element, the focusing element, and the multi-layer reflecting unit are configured in such a way that the light beams reflected from the multi-layer reflector travel to the plurality of optical fiber ports.

6. The WSS apparatus according to claim 5, wherein the plurality of optical fiber ports comprise a first optical fiber port and a second optical fiber port, the first optical fiber port outputting a first light beam and the second optical fiber port a second light beam, the multi-layer reflector of the multi-layer reflecting unit comprising a first layer and a second layer, each of the first and second layers including the plurality of pixels that are individually controllable by the reflection controller.

7. The WSS apparatus according to claim 6, wherein the first and second optical fiber ports and the wavelength dispersion element are configured to allow the first and second light beams to cross before reaching the focusing element, whereby the first light beam hits on the second layer of the multi-layer reflector while the second light beam hits on the first layer of the multi-layer reflector.

8. The WSS apparatus according to claim 6, wherein the first and second optical fiber ports, the wavelength dispersion element, and the focusing element are configured to allow the first and second light beams to cross after passing through the focusing element, whereby the first light beam hits on the second layer of the multi-layer reflector while the second light beam hits on the first layer of the multi-layer reflector.

9. The WSS apparatus according to claim 6, wherein the first and second optical fiber ports, the wavelength dispersion element, and the focusing element are configured to keep the first and second light beams from crossing at any point in a light travelling path between the plurality of optical fiber ports and the multi-layer reflecting unit, whereby the first light beam hits on the first layer of the multi-layer reflector while the second light beam hits on the second layer of the multi-layer reflector.

10. The WSS apparatus according to claim 1, wherein each of the plurality of layers on the main surface of the multi-layer reflector comprises a liquid crystal (LC) phase array, the amount of the light beams being controlled by a voltage or current applied to the LC phase array by the reflection controller, and wherein the multi-layer reflector comprises a plurality of mirrors arranged opposite side of the main surface, each mirror being configured such that the light beams reflected therefrom travel in a direction to predetermined one of the plurality of optical fiber ports.

11. The WSS apparatus according to claim 10, wherein the multi-layer reflector further comprises a birefringent material in front of the LC phase array to refract the light beams passing therethrough according to the polarization of the light beams, thereby changing a light path and the amount of the light beams to the predetermined optical fiber port.

12. The WSS apparatus according to claim 1, wherein each of the plurality of layers on the main surface of the multi-layer reflector comprises one selected from the group consisting of a liquid crystal on silicon (LCOS) and a micro-electromechanical system (MEMS) for steering the light beams to one of the plurality of optical fiber ports or to other directions to thereby control the amount of the light beams entering the plurality of optical fiber ports.

13. The WSS apparatus according to claim 1, wherein the plurality of pixels in each layer on the main surface of the multi-layer reflector are configured to attenuate or block the light beams reflected therefrom by controlling each pixel by the reflection controller, wherein the plurality of optical fiber ports, the wavelength dispersion element, the focusing element, and the multi-layer reflecting unit are configured in such a way that the light beams reflected from the multi-layer reflector travel to the plurality of optical fiber ports, wherein the plurality of optical fiber ports comprise a first optical fiber port and a second optical fiber port, the first optical fiber port outputting a first light beam and the second optical fiber port a second light beam, the multi-layer reflector of the multi-layer reflecting unit comprising a first layer and a second layer, each of the first and second layers including the plurality of pixels that are individually controllable by the reflection controller, wherein the first and second optical fiber ports and the wavelength dispersion element are configured to allow the first and second light beams to cross before reaching the focusing element, whereby the first light beam hits on the second layer of the multi-layer reflector while the second light beam hits on the first layer of the multi-layer reflector.

14. The WSS apparatus according to claim 13, further comprising an output fiber port that is connected to the plurality of optical fiber ports via a plurality of circulators.

15. A wavelength selective switch (WSS) apparatus comprising:

a plurality of optical ports configured to output light beams at different angles from one another;

a wavelength dispersion element configured to disperse the wavelength components of each light beam;

a focusing element configured to focus the dispersed wavelength components of the light beams; and a multi-layer reflecting unit configured to reflect the focused light beams to the focusing element, the multi-layer reflecting unit including a multi-layer reflector and a reflection controller operatively connected to the multi-layer reflector, the multi-layer reflector having a main surface for reflecting the light beams on which a plurality of layers are provided, each layer including a plurality of pixels that are individually controllable by the reflection controller, wherein the plurality of optical ports comprise N input ports and an output port, where N is a natural number equal to or greater than two, the N input ports being connected to a coupler which is in turn connected to the output port, and wherein the multi-layer reflecting unit is configured to reflect predetermined wavelength components of the light beams to predetermined one of the N input ports and blocks the predetermined wavelength components of the light beams from entering any of the rest N−1 input ports by controlling the plurality of pixels on the multi-layer reflector by the reflection controller.

16. The WSS apparatus according to claim 15, wherein the N input ports are connected to the coupler via N circulators.

17. A wavelength selective switch (WSS) apparatus comprising:
a plurality of optical ports configured to output light beams at different angles from one another;
a wavelength dispersion element configured to disperse the wavelength components of each light beam;
a focusing element configured to focus the dispersed wavelength components of the light beams; and
a multi-layer reflecting unit configured to reflect the focused light beams to the focusing element, the multi-layer reflecting unit including a multi-layer reflector and a reflection controller operatively connected to the multi-layer reflector, the multi-layer reflector having a main surface for reflecting the light beams on which a plurality of layers are provided, each layer including a plurality of pixels that are individually controllable by the reflection controller,
wherein the plurality of optical ports comprise an input port and M output ports, where M is a natural number equal to or greater than two, the input port being connected to a splitter which is in turn connected to the M output ports, and wherein the multi-layer reflecting unit is configured to reflect predetermined wavelength components of the light beams to predetermined one of the M output ports and blocks the predetermined wavelength components of the light beams from entering any of the rest M−1 output ports by controlling the plurality of pixels on the multi-layer reflector by the reflection controller.

18. The WSS apparatus according to claim 17, wherein the splitter is connected to the M output ports via M circulators.

19. A method of controlling a wavelength selective switch (WSS) apparatus comprising:
outputting light beams, by a plurality of optical fiber ports, at different angles from one another;
dispersing the wavelength components of each light beam using a wavelength dispersion element;
focusing the dispersed wavelength components of the light beams using a focusing element configured to; and
reflecting the focused light beams to the focusing element using a multi-layer reflecting unit, the multi-layer reflecting unit including a multi-layer reflector and a reflection controller operatively connected to the multi-layer reflector, the multi-layer reflector having a main surface for reflecting the light beams on which a plurality of layers are provided, each layer including a plurality of pixels that are individually controllable by the reflection controller,
wherein the WSS apparatus is arranged that a predetermined wavelength component of a light beam output from one of the optical fiber ports is reflected by the multi-layer reflector to travel back to the one of the optical fiber ports.

20. The method of claim 19, further comprising:
changing polarizations of the light beams input thereto and outputting the light beams with substantially one polarization using a polarization diversity element; and
anamorphic expanding the light beams using an anamorphic expansion element.

* * * * *